(12) United States Patent
Tengler et al.

(10) Patent No.: US 8,705,724 B2
(45) Date of Patent: Apr. 22, 2014

(54) METHOD OF POSTING A VOICE RELATED MESSAGE ON A REMOTELY ACCESSIBLE NETWORKING PAGE

(75) Inventors: Steven C. Tengler, Grosse Pointe Park, MI (US); Wylie R. Burt, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 1094 days.

(21) Appl. No.: 12/711,897

(22) Filed: Feb. 24, 2010

(65) Prior Publication Data
US 2011/0206191 A1 Aug. 25, 2011

(51) Int. Cl.
*H04M 3/00* (2006.01)
*H04W 24/00* (2009.01)

(52) U.S. Cl.
USPC ............... 379/265.09; 379/88.17; 455/456.3

(58) Field of Classification Search
USPC ............ 379/88.17, 88.18, 265.09; 455/456.3, 455/466; 709/204, 206; 719/328
See application file for complete search history.

(56) References Cited

U.S. PATENT DOCUMENTS

2009/0170434 A1* 7/2009 Tengler et al. ............... 455/41.2
2010/0113160 A1* 5/2010 Belz et al. .................... 463/42
2011/0047182 A1* 2/2011 Shepherd et al. ............. 707/780

FOREIGN PATENT DOCUMENTS

WO    WO 2008084207 A1 *  7/2008  ............. H04L 12/58

* cited by examiner

*Primary Examiner* — Antim Shah
(74) *Attorney, Agent, or Firm* — Dierker & Associates, P.C.

(57) ABSTRACT

A method of posting a voice related message on a remotely accessible networking page includes receiving, at a data center, a voice connection from a communications device. An account on the remotely accessible networking page that is associated with the voice connection is identified at the data center. A voice post is generated during or from the voice connection. Via the data center, the voice post is associated with the remotely accessible networking page so that the voice post is associated with the identified account.

17 Claims, 3 Drawing Sheets

METHOD OF POSTING A VOICE RELATED MESSAGE ON A REMOTELY ACCESSIBLE NETWORKING PAGE

TECHNICAL FIELD

The present disclosure relates generally to methods of posting voice related message(s) on a remotely accessible networking page.

BACKGROUND

Social and/or professional networking websites such as, e.g., Twitter™, Facebook™, MySpace®, LinkedIn®, and the like have recently been adopted as a convenient and accessible means of online communication. Such social and/or professional networking websites enable a user to create his/her own personal webpage upon which the user can post questions, blogs, personal data, pictures, videos, music, and/or the like. Such information may then be viewed by "friends" who have access to the user's personal webpage.

SUMMARY

A method of posting a voice related message on a remotely accessible networking page is disclosed herein. The method involves receiving, at a data center, a voice connection from a communications device and identifying an account on the remotely accessible networking page that is associated with the voice connection. The account is identified at the data center. The method further involves generating a voice post during or from the voice connection and, at the data center, associating the voice post with the remotely accessible networking page so that the voice post is associated with the identified account.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method disclosed herein may be used to post a voice related message on a networking page (such as, e.g., a user's personal webpage hosted by a social and/or professional networking website), where such voice message may be viewed and/or heard by members of an online networking group. The posting of the voice message may be accomplished by establishing a voice connection with a data center and generating a voice post during or from the voice connection. In an example, the posting of the voice post is performed by the data center. It is to be understood that the voice post may initiate a voice blog or contribute to an existing voice blog when the voice post is posted, in a user-desired format, onto the networking page. The entire voice blog (including the voice post) may be audibly viewable by members (or friends) of the user's online networking group.

It is to be understood that, as used herein, the term "user" includes i) a vehicle owner, operator, and/or passenger, and/or ii) a person or entity who/that participates in online networking. It is further to be understood that the term "user" may be used interchangeably with the term subscriber/service subscriber. In the examples described hereinbelow, the user has a vehicle and also has his/her own personal webpage upon which the voice message is posted.

As also used herein, the term "member" refers to a person or entity who/that has been invited, by the user of a networking page, to access and view the networking page, and such person or entity has accepted the user's invitation. A member may also refer to a person or entity who/that has invited the user to be a part of a networking group, and the user has accepted such invitation. The networking page is generally associated with a host server. As used herein, a "host server" refers to a processor or computer upon which information of a website resides. In the examples disclosed herein, the website is a networking site, examples of which include a professional and/or social networking site. Non-limiting examples of social networking sites include Facebook™, Twitter™, LinkedIn®, and MySpace®. It is to be understood that the term "member" may be used interchangeably with the term "friend".

Furthermore, the term "upload," as used herein, may be used as a noun that refers to a message (such as, e.g., a voice message, a text message, a picture, a video, an audio clip, etc.) that is uploaded or posted onto the host server of the website hosting the user's personal webpage. It is to be understood that the term "upload" may be used interchangeably herein with the term "post", "status update", etc. It is to be further understood that, if the user's personal webpage is associated with Twitter™ as the networking site, an upload may also be referred to as a "tweet".

In examples of the method disclosed herein, the upload may be a voice message that, when posted on the webpage, initiates or contributes to a blog. As used herein, the term "blog", when used as a noun, refers to a portion of the user's webpage including a log of one or more entries by i) the user, or ii) friends of the user, where such entries include commentary, descriptions of events, pictures, videos, etc. The entries in a blog may be displayed in chronological order, in reverse-chronological order, or in a format selected by the user. When used as a verb, the term "blog" or "blogging" refers to the act of maintaining and/or contributing to the blog. Furthermore, the term "voice blog" refers to a log of one or more voice posts, or locators associated with voice posts, of the user, where such voice post(s) and/or locator(s) is/are posted, by a data center, onto the user's networking page. In some instances, the voice post may be posted on the user's networking webpage in the form of a video, and such may used to initiate or contribute to a "video blog". As used herein, a voice blog or a video blog may be referred to as a "vlog", and the user of the voice blog or the video blog may be referred to as a "vlogger".

Additionally, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween). In one example, a voice connection is a voice call (e.g., between a data center and a vehicle user), and in another example a voice connection is a voice communication (e.g., a recording received as packet data).

Also, the term "communication" is to be construed to include all forms of communication, including direct and indirect communication. As such, indirect communication may include communication between two components with additional component(s) located therebetween.

It is to be understood that the examples of the method disclosed herein may be performed in any system including a communications device. The communications device may be mobile or non-mobile. Some non-limiting examples of such communications devices include vehicle dedicated communication units, cellular phones, personal digital assistants, laptop computers, and/or the like. For purposes of illustration, the examples of the method will be described hereinbelow for use in conjunction with a vehicle dedicated communications unit, such as a telematics unit (identified by reference numeral 14 in FIG. 1), that is operatively disposed in a vehicle (identified by reference numeral 12 in FIG. 1). This system is considered to be an example of the system 10 for posting a voice message on a remotely accessible networking page, and will be described in detail below at least in conjunction with FIG. 1.

Figure 1:
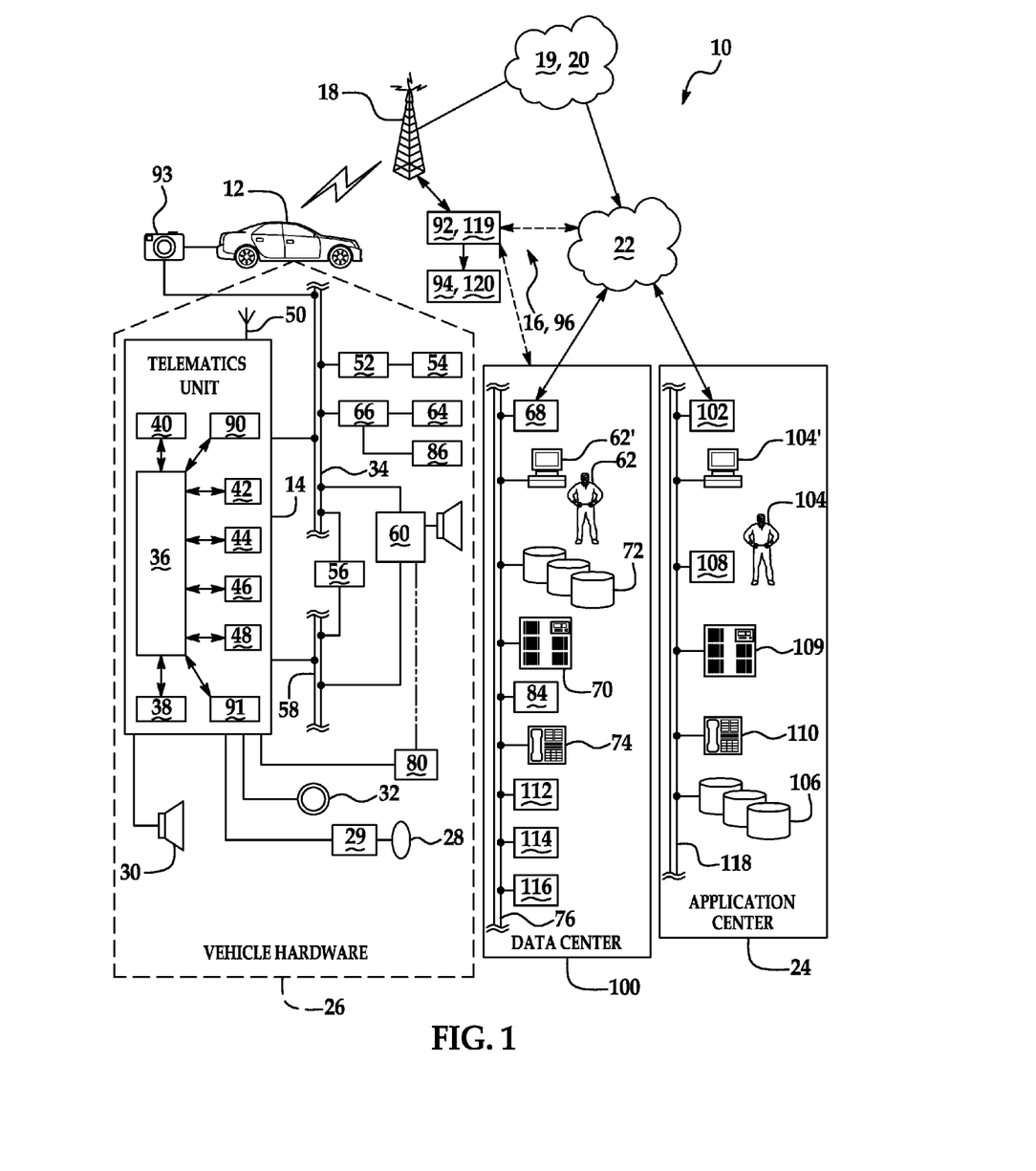
FIG. 1 is a schematic diagram depicting an example of a system for posting a voice related message on a remotely accessible networking page.

Referring now to FIG. 1, the system 10 includes the vehicle 12, the telematics unit 14, a carrier/communication system 16 (which may include wired or wireless components, including, but not limited to, one or more cell towers 18, one or more base stations 19 and/or mobile switching centers (MSCs) 20, and one or more service providers (not shown)), one or more land networks 22, one or more data centers 100, and one or more application centers 24 (which may also be referred to as an application specific call center). In an example, the carrier/communication system 16 is a two-way radio frequency communication system.

The carrier/communication system 16 also includes one or more host servers 92, 120 including suitable computer equipment (not shown) upon which information of a website resides/is stored. As disclosed herein, one of the websites may be a networking site with which a remotely accessible page 94 (e.g., a webpage) is associated, and another of the websites may be a service site and/or account managing site associated with the data center 100. In an example, the remotely accessible page 94 is a networking page set up and maintained by the user, for example, and such webpage 94 is hosted by a social networking website. While, in this example, the webpage 94 is discussed as being a personal webpage of the user, it is to be understood that the webpage 94 may be run and owned by the entity operating the social networking website and is stored on the host server 92. It is further to be understood that the webpage 94 may be also be run and owned by the user who operates his/her own social networking site, where such site is stored on a user-owned host server.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. In an example, the microphone 28 is part of a voice module 29 that is configured to receive voice commands from, for example, the user. Generally, these hardware 26 components enable a user to communicate with the telematics unit 14 and any other system 10 components in communication with the telematics unit 14.

In an example, the vehicle hardware 26 also includes a camera 93. In an example, the camera 93 may be configured to generate images (e.g., photographs) of portions of the interior or the exterior of the vehicle 12 (depending, at least in part, on how/where the camera 93 is positioned inside the vehicle 12). In another example, the camera 93 may be configured to record a video of such interior and/or exterior portions of the vehicle 12. The camera 93 may be selected from stationary devices or rotating devices, and is used to generate images or videos that may be associated with the voice post and uploaded onto the webpage 94, by the data center 100, as part of a voice blog.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like. In an example, the vehicle bus 34 also enables the telematics unit 14 to receive vehicle data from the various units of equipment and systems of the vehicle 12. Such vehicle data may include, but is not limited to, location-based data (e.g., a then-current location of the vehicle 12), infotainment data, video data or photographs taken, e.g., from the in-vehicle camera 93, data pertaining to vehicle operations (e.g., gas mileage, tire pressure, HVAC system operation, vehicle diagnostic information, urea levels, battery charge state, etc.), and/or the like.

The telematics unit 14 is an onboard device that provides a variety of services, both individually and through its communication with the application center 24 and/or data center 100. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In some cases, the telematics unit 14 further includes a recorder 90. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be short-range wireless communication technologies, such as BLUETOOTH®, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The recorder 90 may be used, by the user, to generate a voice post within the vehicle 12, and such voice post may be transmitted to the data center 100 from the telematics unit 14. When the user desires to record a voice memo/post, he/she activates a push button 32 that initiates the recorder 90. Once the recorder 90 is ready, the telematics unit 14 transmits a signal within the vehicle 12 that lets the user know to begin speaking. The user then iterates the utterances in the vehicle 12. The microphone 28 converts the acoustical pressure waves (sound) into electrical signals, which are recorded by the recorder 90.

Once captured, the voice post may be transmitted to the data center 100 during a voice connection in the form of packet data over a packet-switch network 96 (e.g., voice over Internet Protocol (VoIP), communication system 16, etc.). The telematics unit 14 may include a vehicle data upload (VDU) system 91, which is configured to receive raw vehicle data or recording(s) from the bus 34, packetize the data or recording(s), and upload the packetized raw data or recording (s) to the data center 100 (or other external entity). The VDU 91 is operatively connected to the processor 36 of the telematics unit 14, and thus is in communication with the data center 100 (and with the application center 24) via the bus 34 and the communication system 16. The VDU 91 may be the telematics unit's central data system that can include its own modem, processor, and on-board database. The database can be implemented using a separate network attached storage (NAS) device or be located elsewhere, such as in memory 38, as desired. The VDU 91 has an application program that handles all of the vehicle data upload processing, including communication with the data center 100 and the application center 24, and the setting and processing of triggers (i.e., preset indicators of when data, recordings, etc. are to be uploaded).

The telematics unit 14 provides numerous services, some of which may not be listed herein, and is configured to fulfill one or more user or subscriber requests. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, webpages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

The voice module 29, via the microphone 28, provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26, data center 100, and application center 24 to selectively communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice connection/communication with the data center 100 (whether it be a live advisor 62 or an automated call response system 62') or with the application center 24 (also whether it be a live advisor 104 or an automated call response system 104'). As one example, one of the buttons 32 may be utilized to initiate a voice call to the data center 100 to generate a voice post that the user wants uploaded onto his/her personal webpage 94. As another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58.

Still referring to FIG. 1, the vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. One or more of the sensors 64 enumerated above may be used to obtain the vehicle data for use by the telematics unit 14 or the data center 100 to determine the operation of the vehicle 12. Non-limiting example sensor interface modules 66 include powertrain control, climate control, body control, and/or the like.

In a non-limiting example, the vehicle hardware 26 includes a display 80, which may be operatively directly connected to or in communication with the telematics unit 14, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

The carrier/communication system 16 may be a cellular telephone system or any other suitable wireless system that transmits signals between the vehicle hardware 26 and land network 22. According to an example, wireless carrier/communication system 16 includes one or more cell towers 18, base stations 19 and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 19 and a cell tower 18 may be co-located at the same site or they could be remotely located, and a single base station 19 may be coupled to various cell towers 18 or various base stations 19 could be coupled with a single MSC 20. A speech codec or vocoder may also be incorporated in one or more of the base stations 19, but depending on the particular architecture of the wireless network 16, it could be incorporated within an MSC 20 or some other network components as well.

Land network 22 may be a conventional land-based telecommunications network that is connected to one or more landline telephones and connects wireless carrier/communication network 16 to the data center 100 and/or to the application center 24. For example, land network 22 may include a public switched telephone network (PSTN) and/or an Internet protocol (IP) network. It is to be understood that one or more segments of the land network 22 may be implemented in the form of a standard wired network, a fiber or other optical network, a cable network, other wireless networks such as wireless local networks (WLANs) or networks providing broadband wireless access (BWA), or any combination thereof.

Data center 100 is designed to provide the vehicle hardware 26 with a number of different system back-end functions. Generally, the data center 100 receives voice and/or data calls, analyzes requests associated with the voice or data calls, and, in some cases, transfers the call to an application specific call/service center (such as the application center 24 shown in FIG. 1, which will be described in detail below). The data center 100 is also in selective and operative communication with the application center 24 via the wireless carrier/communication system 16 or via a wired connection. Additionally, for purposes of the instant disclosure, the data center 100 is in selected and operative communication with the telematics unit 14 and the host servers 92, 119, and is configured to operate a blogging service for one or more subscribers. As such, the data center 100 is configured to receive voice connections from the telematics unit 14, where voice post(s) may be generated from such connections and uploaded to a desirable webpage (e.g., page 94).

According to the example shown here, the data center 100 generally includes one or more switches 68, servers 70, databases 72, live and/or automated advisors 62, 62', a processor 84, various modules (e.g., an audio recording module 112, a software module 114, and a communications module 116), as well as a variety of other telecommunication and computer equipment 74 that is known to those skilled in the art. These various data center components are coupled to one another via a network connection or bus 76, such as one similar to the vehicle bus 34 previously described in connection with the vehicle hardware 26.

The processor 84, which is often used in conjunction with the computer equipment 74, is generally equipped with suitable software and/or programs configured to accomplish a variety of data center 100 functions. The processor 84 may further be configured to run programs for performing some of the application center 100 back end functions (discussed further hereinbelow).

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72. In either instance, the entity (e.g., 62, 62' or modem) of the data center 100 receiving the transmission determines (by asking the caller or by analysis of the data) who/what is calling, the need/request of the calling entity, and where to further direct the call to obtain the desired assistance.

In an example, the switch 68 may receive a voice call from the user requesting to join a voice blogging service. In this example, the switch 68 routes the voice call to the advisor 62, 62' who will guide the user through the generation of the voice post, or to the module 114 which will generate the post from received data.

In another example, an application center 24 may be a dedicated facility for managing and handling transmissions related to the voice blogging service. In this particular example, upon receiving a voice call, the switch 68 routes the voice call to the switchboard 102 at the voice blogging application center 24 (which may also be a website application center including a voice blogging division), and then such call is routed by the switchboard 102 to an appropriate application center advisor 104, 104' who will assist the caller. In this particular example, upon receiving a data call, the switch 68 routes the data call to the switchboard 102 at the voice blogging application center 24, and then such call is routed by the switchboard 102 to a module (not shown, but similar to module 114) that will analyze the data in the transmission to generate a suitable post. When the application center 24 is a dedicated voice blogging center, it will include components such as modules 112, 114 and 116 shown in data center 100. Further details of the application center 100 will be provided below.

Referring back to the description of the data center 100, it is to be understood the database(s) 72 may be designed to store subscriber profile records, subscriber behavioral patterns, or any other pertinent subscriber information. The database(s) 72 may also allow the data center 100 to function as a repository for data collected from the telematics unit 14 and/or from the application center 24. In some instances, another facility may function as a repository for the collected data (e.g., a lab (not shown) associated with the application center 24 and/or the data center 100).

The communications module 116 is configured, via suitable communications equipment (such as equipment capable of handling messaging between the data center 100 and the telematics unit 14 (e.g., VehComm), modems, TCP/IP supporting equipment, and/or the like), to enable the data center 100 to establish a communication with the telematics unit 14, or visa versa. In an example, the communications module 116 is configured to initiate a packet session with the telematics unit 14. The packet session may, for example, be used by the data center 100 to request vehicle data from at least one vehicle system through the telematics unit 14. Such vehicle data may be used, by the data center 100, to generate a message (such as a text message) that is associated with the voice post. In some cases, the message may be uploaded along with the voice post onto the user's personal webpage 94. In an example, the message may be used to define, clarify, or provide additional information pertaining to the voice post. For example, if the voice post recites, "I am at the art museum downtown", upon obtaining data of the then-current location of the vehicle 12 from the telematics unit 14 during the packet session, the data center 100 may generate a text message that states "the Detroit Institute of Arts located on Woodward Avenue in Detroit, Mich.", and post the text message next to the voice post on the webpage 94.

In an example, the communications module 116 is also configured to transmit a message (e.g., an e-mail, a text message, or the like) to an account (e.g., the user), where such message includes an invitation for the user to join a voice blogging service. The invitation may include, for example, a phone number that use may be used by the user to establish a direct call with the data center 100 or a voice blogging service division (not shown) at the application center 24 so that the user can sign up for the voice blogging service. The invitation may also or otherwise include a general call number for the data center 100, and when such general call number is used, the switchboard 68 routes the call to an advisor 62, 62' or 104, 104', depending upon where the signing up process takes place.

The invitation may also or otherwise include a hyperlink that, when selected by user via, e.g., a mouse click, takes the user to a webpage 120 hosted by the server 119. The server 119 may, in an example, be associated with the data center 100 or the application center 24. Such webpage 120 may be set up by the data center 100 or application center 24 in order to allow customers to sign up for the voice blogging service without having to call to the data center 100 or the application center 24. Further details regarding the method for signing up for the voice blogging service will be described below.

The audio recording module 112 generally includes suitable hardware and/or software for recording verbal utterances from the user during a voice connection with the telematics unit 14. During an audio recording mode, the audio recording module 112 captures (i.e., receives, converts, and records) the user's voice utterances, and configures such utterances into a format suitable for uploading onto the user's webpage 94 in the form of a voice post. In some instances, the verbal utterances may include more words than are desirable for the voice post. For example, in response to being prompted to record a voice post, the user may recite, "I would like to post that 'I'm near the art museum downtown'". Since the words are said within a predetermined recording time frame (e.g., 20 seconds), the entire utterance is recorded. However, it is clear that the user actually wants to post the recitation "I'm near the art museum downtown", rather than "I would like to post that I'm near the art museum downtown." In these instances, the verbal communication may be edited by the software module 114 at the data center 100 to remove the portion of the utterance that stated "I would like to post that" so that the voice post simply contains the remaining portion of the verbal communication.

Similarly, the software module 114 is also configured to edit pre-recorded voice communications (e.g., those recorded in the vehicle 12 as previously described) received at the data center 100. A similar pre-recorded voice memo as previously described (e.g., I would like to post that 'I'm near the art museum downtown') may be received by the data center 100 as a packetized communication. The software module 114 receives this communication and analyzes the packetized communication to designate a voice post payload (i.e., at least a portion of the information/code in the communication that is to be used as the post), and then transform (via a suitable software routine) the voice post payload into the voice post.

It is to be appreciated that the data center 100 may be any central or remote facility, manned or unmanned, mobile or fixed, to or from which it is desirable to exchange voice and data communications. Furthermore, the live advisor 62 may be physically present at the data center 100 or may be located remote from the data center 100 while communicating therethrough.

The application center 24, which is in selective and operative communication with the data center 100, is a dedicated facility for addressing specific requests, needs, or the like of the user, the data center 100, or both. In an example, several application centers 24 may be associated with the data center 100, where each application center is designed to address the specific request, need, etc. Examples of such application centers 24 include, but are not limited to, emergency service centers, navigation route centers, voice blogging services, or the like.

As shown in FIG. 1, the application center 24 may include a switchboard 102, databases 106, live and/or automated advisors 104, 104', the processor(s) 108, a server 109, as well as a variety of other telecommunication and computer equipment 110 that is known to those skilled in the art. In some instances, the application center 24 may also include various modules (such as a communications module 116, an audio recording module 112, and a software module 114). In such instances, the modules at the application center 24 may be used to perform the functions described above for the modules 112, 114, and 116 at the data center 100. These various application center components are coupled to one another via a network connection or bus 118, such as one similar to the vehicle bus 34 or the data center bus 76 described above.

Switchboard 102, which may be a private branch exchange (PBX) switch, routes incoming signals so that voice transmissions (e.g., voice calls) are usually sent to either the live advisor 104 or the automated response system 104', and data transmissions (e.g., packetized voice communications) are passed on to a modem or other piece of equipment (not shown) for demodulation and further signal processing. The modem preferably includes an encoder, as previously explained, and can be connected to various devices such as the server 109 and database 106.

The database(s) 106 may be designed to store a variety of information usable by the application center 100. When the application center 100 is a navigation route service center, the database(s) 106 may store various routes and/or points of interest often requested by a particular user. When the application center 100 is a voice blogging service center, the database(s) 106 may be designed to store voice posts uploaded onto the user's webpage 94 in an archive. Such archive may be personal to the user, and includes voice posts that have been generated and uploaded onto the user's webpage 94 over time. The user may, in an example, select a number of voice posts in the archive, where such voice posts may be posted together on the user's webpage 94 to create, e.g., a tour. The archive may also be managed by the user, where the user may select to remove and/or delete certain voice posts and/or may select certain posts to permanently remain in the archive. When voice blogging services are provided by the data center 100, it is to be understood that such an archive may be generated and stored in the database(s) 72.

Referring back to the general functions of the application center 24, it is to be understood that similar to the data center live advisor 62, the application center live advisor 104 may be physically present at the application center 100 or may be located remote from the application center 24 while communicating therethrough.

The system 10 also includes cellular service provider (not shown) that owns and/or operates the carrier/communication system 16. It is to be understood that, although the cellular service provider (not shown) may be located at the data center 100 or application center 24, both the data center 100 and the application center 24 are separate and distinct entities from the cellular service provider. In an example, the cellular service provider is located remote from the data center 100 and the application center 24. A cellular service provider provides the user with telephone and/or Internet services, while the data center 100 and the application center 24 are telematics service providers. The cellular service provider is generally a wireless carrier (such as, for example, Verizon Wireless®, AT&T®, Sprint®, etc.). It is to be understood that the cellular service provider may interact with the data center 100 and/or the application center 24 to provide various service(s) to the user.

Examples of the method will now be described herein in conjunction with FIGS. 2 and 3. As stated above, such examples will be described using the system 10 discussed in detail above. Again, it is to be understood that the examples of the method may be accomplished using other systems; not necessarily those that use telematics 14 as a mobile communication means.

Figure 2:
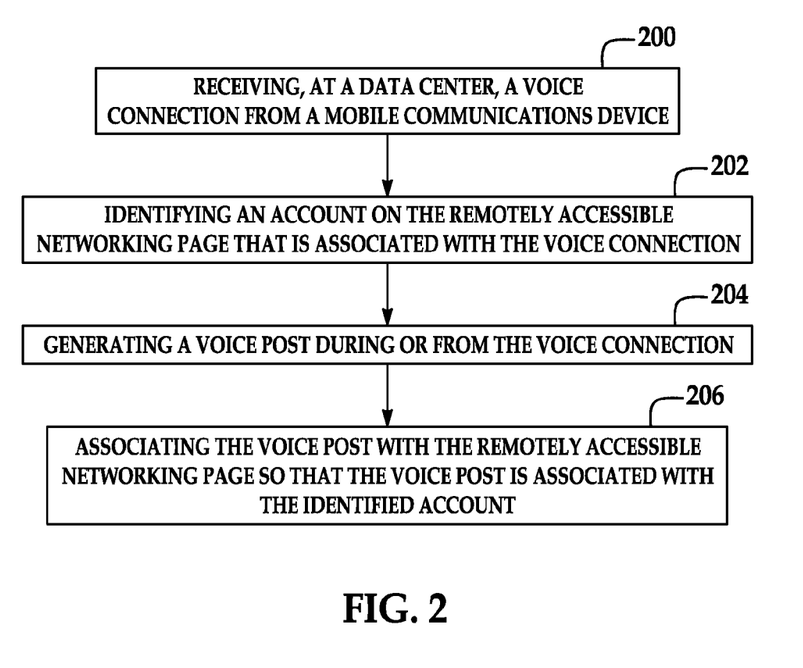
FIG. 2 is a flow diagram depicting an example of a method of posting a voice message on a remotely accessible networking page.
Figure 3:
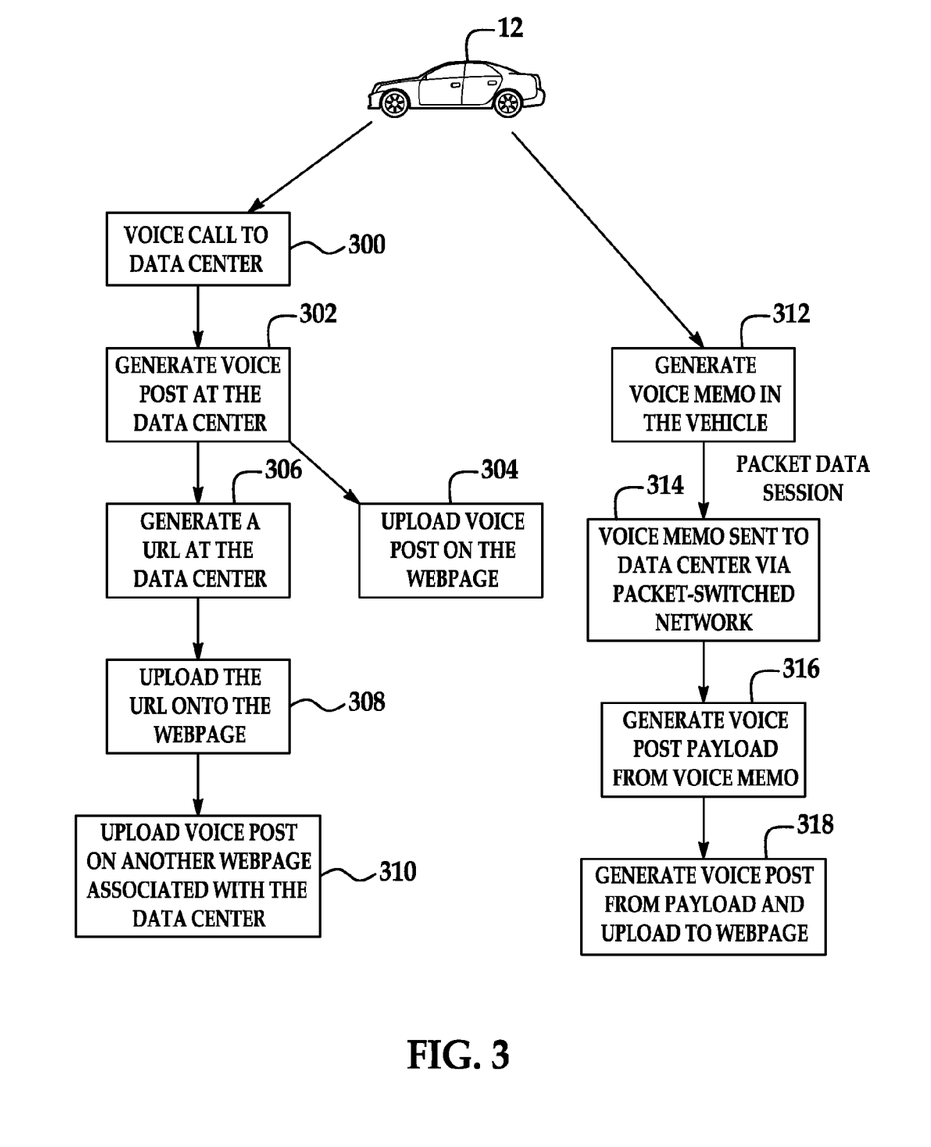
FIG. 3 is a flow diagram depicting additional examples of the method of posting a voice message on a remotely accessible networking page.

Further, the examples of the method disclosed herein (as depicted in FIGS. 2 and 3) may be accomplished so long as an account has been set up with the data center 100, and the owner of the account has joined a voice blogging service provided by the data center 100. As used herein, the term "account" refers to a representation of a business relationship established between the user and the owner of the data and application centers 100 and 24, where such business relationship enables the user to request and receive services from the data center 100 and, in some instances, the application center 24. The business relationship may be referred to as a subscription agreement/contract between the user and the owner of the data center 100 and application center 24, where such agreement generally includes, for example, the type of services that the user may receive, the cost for such services, the duration of the agreement (e.g., a one-year contract, etc.), and/or the like. In an example, the account may be set up by calling the data center 100 (e.g., by dialing a phone number for the data center 100 using the user's cellular, home, or other phone) and requesting to (or selecting from a set of menu options) to speak with an advisor 62 to set up an account. In an example, the switch 68 at the data center 100 routes the call to an appropriate advisor 62, who will assist the user with opening and/or setting up the user's account. When the account has been set up, the details of the agreement established between the data center 100/application center 24 owner and the user, as well as personal information of the user (e.g., the user's name, garage address, home phone number, cellular phone number, electronic mailing (e-mail) address, etc.) are stored in a user profile in the database 72 at the data center 100. The user profile may be used by the data center 100 and/or the application center 24, for example, when providing requested services or offering new services to the user.

When new services become available or a user has not yet signed up for existing services (such as, e.g., a voice blogging service), the data center 100 or the application center 24 may notify the user of such services during a voice call between the user and data center 100 or the application center 24. Such a call may be initiated by either the user or the data or application center 100 or 24. During the call, the advisor 62 or 104 may notify the user of the service, and also ask the user if he/she would be interested in signing up for the service. If the user is conversing with an advisor 62, 62' at the data center 100 when he/she indicates that he/she would be interested in the voice blogging service, the advisor 62, 62' i) may sign the user up, ii) may provide the user with a phone number that he/she may use to directly access the voice blogging division at the data center 100 or application center 24 to sign up for the service, or iii) may route the user's call to the voice blogging division at the data center 100 or the application center 24.

In another example, the user may be solicited by the data center 100 (or application center 24 if designated for providing the specific services). In one example of such a solicitation, an advisor 62 at the data center 100 calls the user directly on his/her cellular phone. During the call, the user may be informed of the availability of the new voice blogging service, and invite the user to sign up. The user may sign up for the service, if he/she so desires, during the same voice call with the data center 100. In another example of such a solicitation, the data center 100 (or application center 24 if designated for providing the specific services) may transmit an invitation to a user's account to join a new (or existing but not yet joined) service (e.g., the voice blogging service). In this example, the data center 100 may retrieve the user's e-mail address from his/her profile stored in the database 72, and then e-mail the invitation to the user. The invitation also includes instructions indicating how the user can go about signing up for the voice blogging service, and a phone number for directly accessing the voice blogging division at the data center 100 (or application center 24). Using the phone number listed in the invitation, the user may directly contact the voice blogging division, and sign up for the voice blogging service during the phone call.

The invitation may also include a request for authorization information and/or for one or more phone numbers of communications device(s) (e.g., the telematics unit 14, a cellular phone, a home phone, etc.) that the user is likely to use when generating voice posts. The authorization information and/or the phone number(s) of the communications device(s) may be stored in the user's profile and subsequently used, by the data center 100 (or application center 24), to authenticate a caller attempting to have a voice post generated and posted on the user's personal webpage (e.g., the webpage 94). For instance, if the caller establishes a voice connection with the data center 100 (via, e.g., a voice call using the telematics unit 14 as the communications device), the data center 100 may attempt to match the phone number of the device from which the call was made with the phone number submitted by the user in response to the invitation for the voice blogging services. If the two phone numbers match, the data center 100 will assume that the caller is authorized to use the voice blogging services under the user's subscription agreement.

Authorization information may also be used, by the data center 100, to authenticate a caller. For instance, when accepting the invitation to sign up for the voice blogging services, the user may provide authorization information which may be used as answers to prescribed challenges presented to a caller when attempting to use the voice blogging services under the user's subscription agreement. The prescribed challenges may include a question or request for information relating to personal information of the user, such as, e.g., "What is your mother's maiden name?", "What was the name of your first pet?", "Describe the color of your first car", and/or the like. The answers to these questions or requests (i.e., the personal or authorization information) are originally answered by the user in response to the invitation, and such answers are stored in the user's profile at the data center 100. When the caller attempts to use the voice blogging services, the caller will be presented with the challenges, and if answered correctly, the caller will be authorized to use the voice blogging services under the user's subscription agreement.

It is to be understood that the application center 24 may also be configured to perform the authorization of the caller in those instances where the application center 24 is configured to provide voice blogging services to the users.

When sent in an electronic mail format, the invitation to join the voice blogging services may also include a hyperlink that, when selected (e.g., via a mouse click) by the user, takes the user to a webpage (e.g., webpage 120) associated with the data center 100 or the application center 24. The user may then sign up for the voice blogging services using that webpage 120. During the sign-up session, the user also submits, to the webpage 120, the requested authorization information and phone number(s) associated with the user's mobile communications device(s).

Once the user has signed up for the voice blogging services, he/she may use the voice blogging services to post a voice related message on his/her personal webpage 94. It is to be understood that the voice blogging services may be used for the amount of time defined in the user's subscription agreement for such services. For instance, if the user signs up for the voice blogging services for six months, the user may use such services as often as desired during the six month subscription agreement. When the six month duration of the voice blogging services is about to elapse (e.g., two weeks before the expiration, or at some other predefined period), for example, the data center 100 may transmit one or more renewal invitations to the user to re-sign up for such services.

It is to be understood that in the examples shown and discussed in reference to FIGS. 2 and 3, the user has signed up (or renewed) to obtain voice blogging services offered by the owner of the data center 100 and application center 24. Referring now to FIG. 2, the user may post a voice related message onto his/her personal webpage 94 by initiating a voice connection with the data center 100 using his/her communications device, such as, e.g., the telematics unit 14. Such voice connection is received by the data center 100 from the telematics unit 14 (as shown by reference numeral 200 in FIG. 2). Upon receiving the voice connection at the data center 100, the data center 100 identifies an account that is associated with the voice connection (as shown by reference numeral 202 in FIG. 2) and, once the account has been identified, a voice post may be generated during or from the voice connection (as shown by reference numeral 204 in FIG. 2). The voice post is then associated with the user's webpage 94, and thus is also associated with the identified account (as shown by reference numeral 206).

The example discussed in reference to FIG. 3 illustrates the voice blogging services being run, managed, etc. by the data center 100. However, it is to be understood that the data center 100 is not the sole entity that can provide such services, and the application center 24 may be configured as the designated voice blogging service entity.

Referring now to FIG. 3, the voice connection may, in an example, be a voice call initiated by the user (as shown by reference numeral 300 in FIG. 3). Such voice call may be made by dialing the phone number for the data center 100 using the telematics unit 14, the user's cellular phone, or the like. In one example, the voice call may be initiated by pressing an access button on the telematics unit 14, where the pressing of the access button automatically establishes a voice call with the data center 100. While speaking into the microphone 28, the caller may request, that the data center 100 generate a voice message that will ultimately be posted on the user's webpage 94. Upon recognizing the user's request, the switchboard 68 at the data center 100 routes the user's call to the appropriate division or component (e.g., an advisor 62, 62') at the data center 100 to fulfill the user's request.

While connected to the data center 100, the account and the associated webpage 94 upon which the voice message is to be posted is identified by the data center 100, and then the caller may be identified as an authorized user of the account. The user's account may be identified by identifying the mobile communications device (e.g., telematics unit 14) making the call (e.g., via the mobile dialing number (MDN) associated with the device). The identification of the caller may be accomplished by authenticating the caller (e.g., asking him/her to answer previously answered and stored personal questions, inputting a personal identification number (PIN), etc.).

It is to be understood that the voice call may be initiated by the user using a mobile communications device other than the telematics unit 14. For instance, the user may initiate the voice call using his/her cellular phone, a landline phone, or other suitable communications device by dialing a phone number for the data center 100. In the case where, for example, the data center 100 does not have the cellular phone number of the user on file, the caller may be authenticated by presenting him/her with the challenge questions described above before attempting to fulfill the caller's request. If the caller is authenticated in this example, the data center 100 may ask the user if he/she would like to add the mobile communications device to the list of approved/recognized devices for the voice blogging services.

While connected to the data center 100, the voice post may be generated by recording a designated portion of the voice call using the audio recording module 112 (as shown by reference numeral 302 in FIG. 3). For example, the caller may state during the voice connection that he/she wants to generate a voice post, where such post states, e.g., "I'm at a professional hockey game downtown!" In some cases, the data center 100 will prompt the caller when to begin reciting the message to be recorded for the voice post. Prompting may be accomplished by instructing the user to begin reciting the message after, e.g., a tone signal (e.g., a beep) or the like. Prompting may otherwise be accomplished by telling the caller when to begin reciting the message (e.g., the advisor 62 at the data center 100 may state, "Please begin your message now", or the like). The user may also be instructed on the length of time for speaking, or may be prompted with a second tone signal that indicates that recording has ended.

In an example, the audio recording module 112 may also be configured to play the recording back to the user to verify that the recording is adequate. After listening to the played-back recording, the user may verify that the recording is in fact adequate via a verbal indication (e.g., by talking into the microphone 28), a physical indication (e.g., via a button or touchscreen press indicating as such), or other suitable means, such as a motion or gesture performed by the user (e.g., a thumbs-up sign to indicate a "yes" response) and captured via either in-vehicle gesture sensor(s) or camera(s) in operative communication with the data center 100). If, for example, the user does not verify that the recording is adequate, the user may be prompted to generate a new recording. It is to be understood that the user may generate new recordings until he/she is satisfied with the voice message.

It is further to be understood that, in some cases, the playback of the recording reveals that additional verbiage was included in the message that the user does not want posted. In these cases, the user may either have a new recording made or may elect to have the original recording edited by the software module 114 at the data center 100. Such options may be presented verbally or via the display 80, and may be selected verbally or physically (e.g., via an in-vehicle button 32 or gesture). When the user elects to re-record, the audio recording module 112 will prompt the user as previously described to record another message. When the user elects to have the data center 100 edit the message, the recording is transmitted to the software module 114 and the user's call may end. The software module 114 will edit the recording to remove portions that are not to be included in the voice post. The software module 114 may be configured to identify words, such as "post", "say", "upload", etc., or phrases, such as "I want to post", "My post should say", etc., that indicate that the user wants to post something, and then to remove this portion of the recording. For instance, the software module 114 may be used to remove a recitation such as "I want to say" that precedes the remainder of the recorded message "I'm at a professional hockey game downtown!"

Once the user is satisfied with the recorded message (or has opted to end the call after recording the voice memo), the data center 100 associates the recorded message with the user's webpage 94. In an example, the associating of the recorded message with the user's webpage 94 may be accomplished by uploading the recorded message as a voice post to the host server 92 of the user's webpage 94 (as shown by reference numeral 304 in FIG. 3). The uploaded voice post may then be used to initiate a voice blog on the user's personal webpage 94. For instance, friends of the user's online networking group (i.e., those that have been authorized to access and view the user's webpage 94) may view/listen to the newly uploaded voice post. One or more of these friends may then reply to the voice post by posting their responses in the voice blog. Such responses may be in the form of text responses, which are viewable by the user as well as any of the friends of the user's online networking group. In some cases, the responses may be in an audio or video format, where such responses are also viewable (audibly and/or visually) by other friends who are part of the online networking group.

In some cases, the voice post may be uploaded onto the user's webpage 94 in reply to previously uploaded post (in the form of voice or text posts) of an already-existing blog. In these cases, the newly uploaded voice post is considered to contribute to the voice blog. Friends of the user's online networking group may also contribute to the voice blog by responding to i) the other previously uploaded posts in the voice blog, or ii) the user's newly uploaded voice post.

In another example, as shown by reference numeral 310 in FIG. 3, the data center 100 may upload the voice post to another host server (such as the server 119) of another webpage (such as the webpage 120 associated, for example, with the data center 100). In this example, associating the voice post with the user's personal webpage 94 is accomplished by uploading a locator of the voice post to the host server 92 for posting on the user's webpage 94. For instance, the data center 100 may generate a uniform resource locator (URL) (shown at reference numeral 306 in FIG. 3), and then upload the URL onto the user's personal webpage 94 (as shown by reference numeral 308 in FIG. 3). Upon accessing the user's webpage 94, the user or a friend of the user may select the URL (via, e.g., a mouse click), which directs the user or friend to the other webpage 120 having the voice post uploaded thereon. It is to be understood that FIG. 3 depicts that the voice post is uploaded onto the other webpage 120 after the URL is uploaded. It is to be understood, however, that such steps may occur in reverse order or may occur substantially simultaneously.

In yet another example, as shown by reference numeral 312 in FIG. 3, the voice post may be generated from a voice memo that was previously recorded by the user via the telematics unit 14 (or another communications device capable of generating and transmitting recorded voice memos), and then the voice post may be uploaded onto the user's webpage 94 by the data center 100. In this example, the user generates the voice memo by recording a voice message using the recorder 90 associated with the telematics unit 14. The recording of the voice message may be accomplished using the method as described above in reference to FIG. 1.

The recorded message (referred to herein as the voice memo) may, in an example, be automatically transmitted from the telematics unit 14 to the data center 100 as soon as the voice memo is made. As one example, the telematics unit 14 may be configured to recognize the OFF signal of the recorder 90, or a predetermined time period after the OFF signal of the recorder 90 is transmitted, as a trigger to send the voice memo to the data center 100. The automatic transmission of the recorded voice memo from the telematics unit 14 to the data center 100 may be accomplished by establishing using the packet-switch network 96 (as shown by reference numeral 314 in FIG. 3). As previously discussed in reference to FIG. 1, the voice memo is packetized via the VDU 91 and transmitted to the data center 100.

In some cases, the voice memo may otherwise be stored in the memory 38 of the telematics unit 14 (or other communications device), and such voice memo may be transmitted to the data center 100 at a later time. When the voice memo is recorded and stored in the vehicle 12, the user may initiate a voice connection with the data center 100 (e.g., via a button press on the telematics unit 14), and request that the data center 100 pull the stored memo from the memory 38. During or after this voice call, the data center 100 may initiate a packet session with the telematics unit 14 to pull the voice memo from the vehicle 12 (see, e.g., reference numeral 314 in FIG. 3).

It is to be understood that the automatic transmission of the voice memo or the storing of the voice memo for later use may be selected by the user prior to or upon generating the voice memo in the vehicle 12.

Upon receiving the voice connection from the telematics unit 14 over the packet-switch network 96, the switch 68 directs the communication/connection to the software module 114, which analyzes the packetized form of the voice memo and generates a voice post payload therefrom, as shown at reference numeral 316 in FIG. 3. In some instances, the voice post payload includes all of the information/code in the communication, and in other instances, the voice post payload includes a portion of the information/code in the communication. The designation of the voice post payload may be based upon predefined words and/or phrases that the module 114 is designed to identify and remove (e.g., "I would like to post," "my post will say", or any other terms that introduce the user's post to the listener). As such, the received voice communication may or may not be edited by the software module 114. Once the voice post payload is generated, the module 114 is then configured to convert such payload into a voice post format (e.g., a way file) for uploading to the user's webpage 94 via the host server 92 (see reference numeral 318).

In any of the examples disclosed herein, the user may submit at least one picture to the data center 100, where such picture(s) may be uploaded as part of the voice blog on the user's personal webpage 94. Examples of such pictures may include a photograph, a computer-generated image of a particular object, or the like. The picture(s) may be obtained from the user's personal workstation (e.g., a personal computer), a personal digital camera, a camera phone, the in-vehicle camera 93, or the like. In this example, the picture(s) may be submitted, by the user, along with instructions for associating the picture(s) with a voice post that will be, or has already been uploaded onto the user's webpage 94. For instance, the user may submit, to the data center 100, photographs taken at the professional hockey game that the user is then-currently attending. Such submission may occur during the voice connection established between the user and the data center 100 for generating the voice post, or during a subsequent connection after the voice post has already been generated. In the latter instance, the picture(s) may be submitted as packet-switch data from the telematics unit 14, via an e-mail sent by the user to the data center 100, or via another suitable transmission means. In some cases, the user can manually deliver or mail the pictures to the data center 100, and such pictures may be scanned into a computerized format suitable for uploading onto the user's webpage 94.

During the submission of the picture(s) to the data center 100, the user may also include an instruction regarding the manner for which the picture(s) may be used. In an example, the instruction includes a command to associate the picture(s) with a particular voice post. The associating may include displaying the picture(s) adjacent on the voice post on the user's webpage 94. For example, one or more photographs taken during the profession hockey game that the user is then-currently attending may be uploaded onto the user's webpage 94, displayed adjacent to the voice post "I'm at a professional hockey game downtown!" The associating may otherwise include uploading the pictures on another webpage (such as the webpage 120), and linking the picture(s) to the voice post via a hyperlink, a URL, or other locator.

In instances where several pictures are associated with a voice post, the user may elect to create a video including the voice post. The video may include, for example, a slide show of the several pictures arranged in chronological order, reverse-chronological order, according to a user-desired sequence, or the like. When the video is viewed by the user or the user's friends, the voice post may be audibly viewed as the pictures are cycled through the slide show. For example, while listening to the voice post "I'm at a professional hockey game downtown!" on the user's webpage 94, the viewer may, at the same time, view the slide show of photographs taken at the hockey game.

In some cases, the user may also select a sound clip, song, or other musical expression to be played in the background as the video is played. For example, the slide show of the hockey game photographs may be set to a particular song by a particular artist chosen by the user as the photographs are cycled through.

It is to be understood that the user may also elect to have a motion video associated with the voice post. The motion video may be obtained, for example, from the user's personal workstation, a personal video camera, a camera phone, the in-vehicle camera 93, or the like, packetized, and then submitted to the data center 100 via the packet-switched network 96.

In still another example, the voice post of the user's utterance may include information that is not entirely defined in the post. For instance, it may not be evident to the user's friends viewing the voice post "I'm on my way to the art museum downtown" where i) "downtown" is, and/or ii) what "art museum" the user is referring to. In such instances, the data center 100 may initiate a packet session with the telematics unit 14 (via, e.g., the communications module 116), where such packet session includes a request for specific vehicle data from the telematics unit 14. In this example, the packet session may include a request for a then-current location of the vehicle 12, and such location-based data may be retrieved by the telematics unit 14 from the GPS component 44 via the vehicle bus 34, and the GPS coordinate data may then transmitted to the data center 100 from the telematics unit 14 via the same or another packet session.

The location-based data may then be used, by the processor 84 at the data center 100, to find at least one point of interest that is within a predefined radius (e.g., within 5 miles of the vehicle) of the then-current location of the vehicle 12. These points of interest may then be transmitted and presented to the user on his/her in-vehicle display 80 or audibly over a voice call so that the user can verify that one or more of the points of interest are accurate. For instance, if the processor 84 finds that the Detroit Institute of Arts is 2 miles away from the vehicle 12, and the Detroit Historical Museum is 2.5 miles array from the vehicle 12, both points of interest will be sent to the user so the user can verify that one of the points of interest is accurate. In an example, the data center 100 may present each point of interest individually to the user, and the user can verify or deny that such point of interest is accurate. In this example, the point of interest closest to the then-current location of the vehicle 12 is presented first. The verification or denial that the first point of interest is accurate may be accomplished, for example, by the user indicating as such verbally (e.g., by reciting the verification or the denial into the microphone 28) or physically (e.g., via a button press, touchscreen, or gesture (e.g., a thumbs-up sign by the user) indicating the verification or the denial).

In instances where the user has denied that the first point of interest presented to him/her is accurate, the data center 100 will present another point of interest to the user for verification. The next point of interest may, e.g., be a museum that is the next closest museum to the then-current location of the vehicle 12. The data center 100 may continue to present the remaining points of interest until the user indicates that one of such points of interest is accurate. In instances where none of the points of interest are accurate, the user may elect to have a new search completed by the data center 100. The user may supply search criteria to the data center 100. The new search would generate a new list of points of interest, which may include some points of interest not previously listed. The user may otherwise elect to end the searching, and thus no point of interest would be associated with the voice post.

If the user does verify that one of the points of interest presented is accurate, the data center 100 uploads a representation of the point of interest onto the host server 92 of the user's personal webpage 94. Such representation may include, for example, a picture of the point of interest, a text message (or text-based post) displayed next to the voice post, a map of the area including the point of interest, or the like. In some instances, the data center 100 also retrieves particular location information (e.g., address and/or directions) and/or contact information (e.g., a phone number) of the point of interest, and posts such information on the webpage 94 as well.

It is to be understood that text posts that are not necessarily associated with a point of interest may also be generated, by the data center 100, and uploaded onto the user's webpage 94. Such text posts are also associated with the voice post and are based on the vehicle data. For instance, a text post may be uploaded to the user's webpage 94 and positioned next to the voice post, where such text post includes the cross roads of the then-current location of the vehicle 12 determined, at least in part, from location-based data obtained from the telematics unit 14. In another instance, a text post/message may be posted on the user's webpage 94 in the same blog as the voice post, where such text post/message includes the speed at which the vehicle 12 is then-currently traveling, which is based, at least in part, on velocity data obtained from the telematics unit 14.

In another example, after the voice post (and any text posts) has/have been uploaded onto the user's webpage 94, and the voice blog has been created, the entire voice blog (including the voice and text posts and any replies by the user's friends) may be stored in an archive of voice blogs in the database 72 at the data center 100. More specifically, the archive of voice blogs includes voice posts and text posts that have been uploaded on the user's webpage 94 over time. The archive is generally managed and maintained by the user, whereby the user may select to have certain voice and/or text posts stored in the archive. Such selection may be accomplished using the user's webpage 94, e.g., by highlighting the voice post and selecting a right-mouse-click save function, selecting a save icon or a save menu option displayed on the webpage 94, or the like. The user may also be able to delete certain voice and/or text posts from the archive. Such may be accomplished, for example, by accessing the archive through the user's webpage 94, and selecting which posts to delete. Deleting may be accomplished by highlighting the post and selecting a right-mouse-click delete function, selecting a delete icon or a delete menu option displayed on the webpage 94, or the like. In some instances, the archive may also be accessible via a webpage 120 that enables the user to access his/her profile at the data center 100 (which may be linked to the archive).

In an example, a number of voice posts may be selected by the user from the archive, and such voice posts may be reposted on the user's webpage 94, where such voice posts are associated with one or more locations on a map, to create a tour. For instance, if the user traveled across the United States, and voice posts were created in New York, Illinois, Colorado, and California along the way, the user may select each of these voice posts stored in the archive along with their respective locations identified on a map of the United States. The map may then be uploaded onto the user's webpage 94, where an icon identifying the respective voice post may be displayed on New York, Illinois, Colorado, and California. The user's friends may then have access to a tour of the user's trip by audibly viewing each of the voice posts displayed on the map.

In still another example, the data center 100 may be configured to recognize whether a voice post includes a request for an urgent service. As used herein, an "urgent service" includes a service that requires immediate attention, and such services generally cannot wait until one of the user's friends view the webpage 94. An example of a voice post that includes a request for urgent services include "My car is stuck in the river!", "I'm having a heart attack!", "I'm lost downtown and cannot find a restaurant to save my life", or the like. In an example, the data center 100 may use a speech recognition system or software to recognize certain key phrases stored in the database 72 at the data center 100 that indicate that the request is urgent. The recognition of such terms indicates to the data center 100 that the post should be reviewed to determine if urgent services are being requested. Key phrases in the provided examples include "stuck", "heart attack", "lost", and "save my life." The phrases would flag to the data center 100 that the post should be reviewed to determine that for which the user is asking. Upon recognizing the request, the data center 100 may initiate a voice call directly to the user, or may instruct an appropriate application center 24 to initiate a voice call directly to the user, with instructions that are responsive to the request (e.g., the navigation services application center 24 may be instructed to provide the user directions to a nearby restaurant), with information pertaining to the request (e.g., an appropriate emergency personnel (e.g., a medical dispatch team, a tow truck, the police, etc.) has been contacted), a textual or audible copy of the voice blog, or the like.

For any of the examples described herein, the voice post may be uploaded and such voice post may be presented on the user's webpage 94 by the data center 100 using default settings. It is to be understood, however, that the user may also personalize such settings prior to the uploading of the voice post. The personalization of the settings may be accomplished by accessing the webpage 94 and selecting certain user preferences including the arrangement and/or presentation of posts on the webpage 94.

Additionally, it is to be understood that for any of the example described herein, the user may also (in addition to or in place of setting preferences) submit, to the data center 100, instructions for a method for presenting the voice post, pictures associated with the voice post, etc. on the user's webpage 94. In an example, such instructions are provided by the user during the voice connection. The voice post is thereafter uploaded onto the user's webpage 94 by the data center 100 according to the user's instructions.

While several examples have been described in detail, it will be apparent to those skilled in the art that the disclosed examples may be modified. Therefore, the foregoing description is to be considered exemplary rather than limiting.

The invention claimed is:

1. A method of posting a voice related message on a remotely accessible networking page, the method comprising:
   receiving, at a data center, a voice connection from a communications device operatively disposed in a mobile vehicle, the communications device being a telematics unit and the voice connection being a voice call;
   after the voice connection is received at the data center, initiating, via a communications module operatively associated with the data center, a packet session with the telematics unit, the packet session including a request for vehicle data from the telematics unit, wherein the vehicle data includes a then-current location of the vehicle;
   via a wireless connection, transmitting the requested vehicle data from the telematics unit to the data center;
   identifying an account on the remotely accessible networking page that is associated with the voice connection, the identifying being accomplished at the data center;
   generating a voice post during the voice connection;
   via the data center, uploading the voice post to a host server of the remotely accessible networking page so that the voice post is associated with the identified account;
   finding, via the data center, at least one point of interest within a predefined radius of the then-current location of the vehicle;
   verifying that the at least one point of interest is accurate; and
   upon verifying, uploading the at least one point of interest onto the host server of the remotely accessible networking page.

2. The method as defined in claim 1 wherein the generating of the voice post is accomplished during the voice call by recording a designated portion of the voice call via an audio recording module.

3. The method as defined in claim 1 wherein prior to receiving the voice connection, the method further comprises:
   via the data center, transmitting an invitation to the account to join a voice blogging service, the invitation including a request for authorization information, a phone number associated with the communications device, or combinations thereof; and
   accepting the invitation, the accepting including a submission, to the data center, of at least one of the requested authorization information and the requested phone number associated with the communications device.

4. The method as defined in claim 3 wherein the identifying of the account of the remotely accessible networking page includes recognizing at least one of i) the authorization information, or ii) the phone number associated with the communications device from which the voice connection was received.

5. The method as defined in claim 1, further comprising:
   submitting at least one of a picture or a motion video to the data center;
   at the data center, associating the at least one of the picture or the motion video with the voice post; and
   uploading the at least one of the picture or the motion video with the voice post onto the host server of the remotely accessible networking page.

6. The method as defined in claim 5 wherein a plurality of pictures is submitted to the data center, wherein the plurality of pictures is associated with the voice post, and wherein the method further comprises:
   creating a video including the voice post associated with the plurality of pictures; and
   uploading the video onto the host server of the remotely accessible networking page.

7. The method as defined in claim 1, further comprising:
   generating a text message at the data center, the text message being i) associated with the voice post, and ii) based on the vehicle date; and
   uploading the text message onto the host server of the remotely accessible networking page.

8. The method as defined in claim 1 wherein the voice connection further includes an instruction for a method of presenting the voice post on the remotely accessible networking page, and wherein the uploading of the voice post is accomplished according to the instruction.

9. The method as defined in claim 1 wherein the uploading of the voice post is accomplished via i) a default setting, or ii) a personalized setting.

10. The method as defined in claim 1, further comprising:
    storing, in a database at the data center, the uploaded voice post in an archive of voice blogs;
    selecting a number of the voice posts stored in the archive; and
    associating the selected number of the voice posts with at least one location on a map, the associating creating a tour of the selected number of voice posts.

11. The method as defined in claim 1, further comprising:
    recognizing the uploaded voice post as a request for an urgent service; and
    via the data center, providing a service responsive to the recognized request.

12. The method as defined in claim 1, further comprising initiating or contributing to a voice blog upon uploading the voice post to the host server of the remotely accessible networking page.

13. A system for posting a voice related message on a remotely accessible networking page, the system comprising:
    a vehicle telematics unit operatively disposed in a mobile vehicle;
    a data center in selective and operative communication with the vehicle telematics unit, the data center being configured to receive a voice connection from the vehicle telematics unit, the voice connection being a voice call;
    a communications module operatively associated with the data center, the communications module being configured to initiate a packet session with the telematics unit, the packet session including a request for vehicle data obtained, by the telematics unit, from the at least one vehicle system, wherein the vehicle data includes a then-current location of the vehicle; and
    a wireless connection established between the communications module at the data center and the telematics unit, the wireless connection enabling a transmission of the vehicle data from the telematics unit to the data center;
    means for generating a voice post during the voice connection;
    a processor operatively associated with the data center, the processor configured to i) identify an account on a remotely accessible networking page that is associated with the voice connection; ii) upload the voice post to a host server of the remotely accessible networking page so that the voice post is associated with the identified account, iii) find at least one point of interest within a predefined radius of the then-current location of the vehicle, iv) verify that the at least one point of interest is accurate, and v) upon verifying, upload the at least one point of interest onto the host server of the remotely accessible networking page; and an online connection established between the data center and the host server of the remotely accessible networking page, the online connection configured to enable the data center processor to upload the voice post and the at least one point of interest.

14. The system as defined in claim 13 wherein the means for generating includes an audio recording module operatively associated with the data center, the audio recording module being configured to generate the voice post by recording a designated portion of the voice call received at the data center.

15. The system as defined in claim 13, further comprising:
a database operatively associated with the data center, the database configured to store the uploaded voice post in an archive of voice blogs; and
means for selecting a number of the voice blogs stored in the archive;
wherein the processor at the data center is further configured to associate the selected number of voice blogs with at least one location on a map to create a tour of the selected number of voice blogs, and wherein the data center is further configured, via the online connection, to upload the tour to the host server of the remotely accessible network page.

16. The system as defined in claim 13
wherein the vehicle data is utilized, by the data center, to generate a text message, and wherein the text message is associated with the voice post, and wherein the data center, via the online connection, is further configured to upload the text message with the voice post to the host server of the remotely accessible networking page.

17. The system as defined in claim 13, further comprising:
a call center in selective and operative communication with the data center, the call center including a communications module configured to transmit an invitation to the account to join a voice blogging service, the invitation including a request for authorization information, a phone number associated with the communications device, or combinations thereof; and
means for accepting the invitation by submitting at least one of the requested authorization information and the requested phone number associated with the communications device.

\* \* \* \* \*